(12) United States Patent
Jayachandran et al.

(10) Patent No.: US 12,500,768 B2
(45) Date of Patent: Dec. 16, 2025

(54) APPARATUS AND METHOD FOR FACILITATING ZERO-KNOWLEDGE PROOFS

(71) Applicant: Onai Inc., Cupertino, CA (US)

(72) Inventors: Guha Jayachandran, Cupertino, CA (US); Patrick Grinaway, Pawling, NY (US); Volkmar Frinken, San Jose, CA (US); Jayavanth Shenoy, Mountain View, CA (US); Galana Gebisa, Mountain View, CA (US); Shriphani Palakodety, San Jose, CA (US)

(73) Assignee: Onai Inc., Cupertino, CA (US)

(*) Notice: Subject to any disclaimer, the term of this patent is extended or adjusted under 35 U.S.C. 154(b) by 148 days.

(21) Appl. No.: 18/377,166

(22) Filed: Oct. 5, 2023

(65) Prior Publication Data
US 2025/0119293 A1    Apr. 10, 2025

(51) Int. Cl.
H04L 9/32    (2006.01)
(52) U.S. Cl.
CPC ................ *H04L 9/3218* (2013.01)
(58) Field of Classification Search
CPC .................................... H04L 9/3218
See application file for complete search history.

(56) References Cited

U.S. PATENT DOCUMENTS

| | | | | |
|---|---|---|---|---|
| 2011/0246779 | A1* | 10/2011 | Teranishi | H04L 9/3013 713/176 |
| 2019/0043043 | A1* | 2/2019 | Saraniecki | H04L 9/3268 |
| 2019/0384935 | A1* | 12/2019 | Miller | H04L 63/104 |
| 2020/0065802 | A1* | 2/2020 | Mathieson | H04L 9/0637 |
| 2020/0322128 | A1* | 10/2020 | Hu | G06F 9/54 |
| 2021/0273807 | A1* | 9/2021 | Wertheim | G06F 9/466 |
| 2024/0333509 | A1* | 10/2024 | Pun | H04L 9/50 |
| 2024/0421998 | A1* | 12/2024 | Wang | H04L 9/3218 |

FOREIGN PATENT DOCUMENTS

CN    115801288 B    4/2023

OTHER PUBLICATIONS

Xue et al., Design of a Blockchain-Based Traceability System with a Privacy-Preserving Scheme of Zero-Knowledge Proof, Publication date: Jun. 29, 2022, p. 1-12; https://www.hindawi.com/journals/scn/2022/5842371/.
Gai et al., Attacking the Edge-of-Things: A Physical Attack Perspective, Publication date: Sep. 3, 2021, p. 5240-5253; https://ieeexplore.ieee.org/document/9528853.

* cited by examiner

*Primary Examiner* — Michael W Chao
*Assistant Examiner* — Devin E Almeida
(74) *Attorney, Agent, or Firm* — Caldwell Intellectual Property Law

(57) ABSTRACT

An apparatus and method for facilitating zero-knowledge proofs is disclosed. The apparatus includes at least a processor and a memory communicatively connected to the at least a processor, the memory contains instructions configuring the at least a processor to identify a trace, divide the trace into a plurality of trace segment, identifying at least an operation of the trace and dividing the trace into the plurality of trace segments as a function of the at least an operation of the trace, recompile the plurality of trace segments for zero-knowledge proof generation and generate a zero-knowledge proof for each of the plurality of recompiled trace segments.

18 Claims, 8 Drawing Sheets

APPARATUS AND METHOD FOR FACILITATING ZERO-KNOWLEDGE PROOFS

FIELD OF THE INVENTION

The present invention generally relates to the field of cryptography. In particular, the present invention is directed to apparatus and method for facilitating zero-knowledge proofs.

BACKGROUND

Zero-knowledge proofs enable a prover to demonstrate the validity of a statement to a verifier without disclosing any additional information beyond its validity. However, current techniques for generating zero-knowledge proofs lack efficiency and effectiveness.

SUMMARY OF THE DISCLOSURE

In an aspect, an apparatus for facilitating zero-knowledge proofs is disclosed. The apparatus includes at least a processor and a memory communicatively connected to the at least a processor, the memory contains instructions configuring the at least a processor to identify a trace, divide the trace into a plurality of trace segments, wherein dividing the trace includes identifying at least an operation of the trace and dividing the trace into the plurality of trace segments as a function of the at least an operation of the trace, recompile the plurality of trace segments for zero-knowledge proof generation and generate the zero-knowledge proof for each of the plurality of recompiled trace segments.

In another aspect, a method for facilitating zero-knowledge proofs is disclosed. The method includes identifying, using at least a processor, a trace, identifying, using the at least a processor, at least an operation of the trace, dividing, using the at least a processor, the trace into the plurality of trace segments as a function of the at least an operation of the trace, recompiling, using the at least a processor, the plurality of trace segments for zero-knowledge proof generation and generating, using the at least a processor, the zero-knowledge proof for each of the plurality of recompiled trace segments.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for facilitating zero-knowledge proofs. The apparatus includes at least a processor and a memory communicatively connected to the at least a processor, the memory contains instructions configuring the at least a processor to identify a trace, divide the trace into a plurality of trace segments, wherein dividing the trace includes identifying at least an operation of the trace and dividing the trace into the plurality of trace segments as a function of the at least an operation of the trace, recompile the plurality of trace segments for zero-knowledge proof generation and generate the zero-knowledge proof for each of the plurality of recompiled trace segments. Exemplary embodiments illustrating aspects of the present disclosure are described below in the context of several specific examples.

Figure 1:
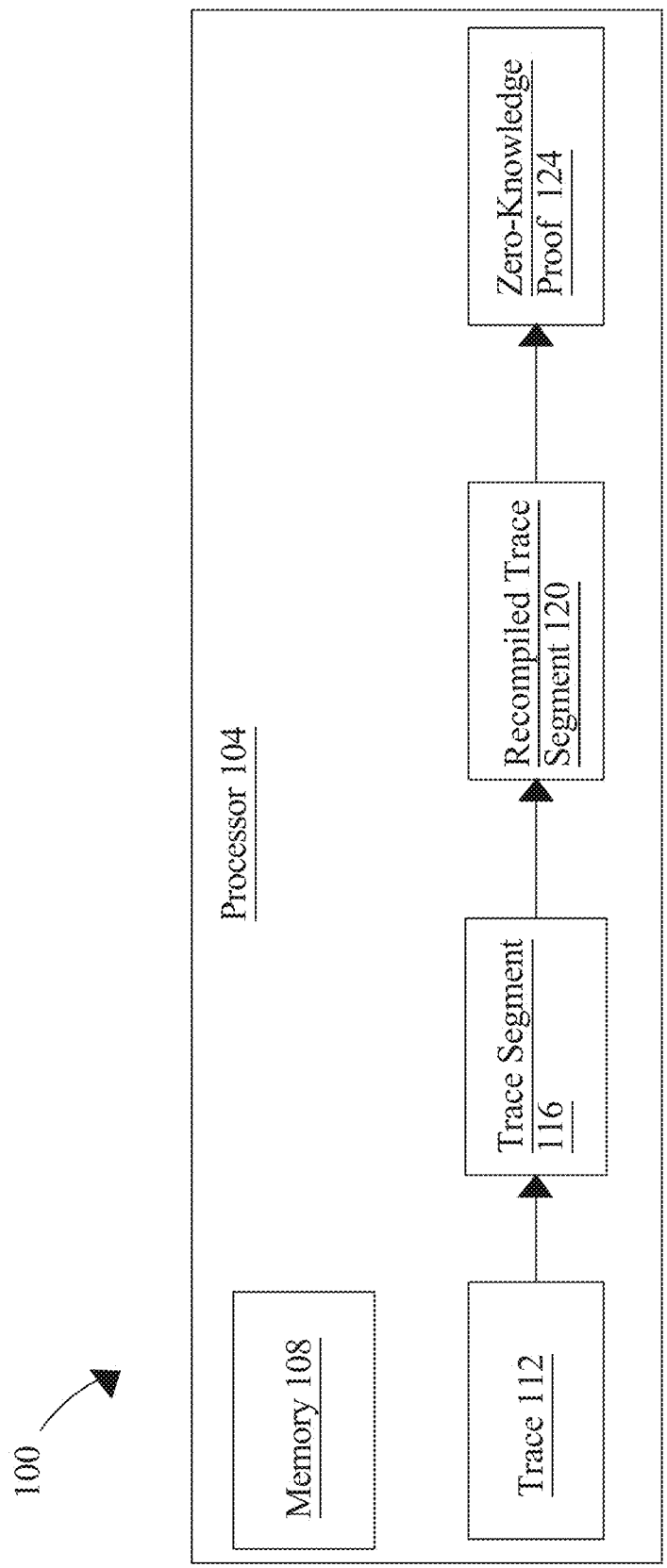
FIG. 1 illustrates a block diagram of an exemplary apparatus for facilitating zero-knowledge proofs.

Referring now to FIG. 1, an exemplary embodiment of an apparatus 100 for facilitating zero-knowledge proofs is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing devices operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices, which may operate in parallel, in series, redundantly, or in any other manner used for distribution of tasks or memory between computing devices. Processor 104 may be implemented, as a non-limiting example, using a "shared nothing" architecture.

Still referring to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic systems may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A "cryptographic hash," as used herein, is a mathematical representation of a lot of data, such as files or blocks in a blockchain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to a lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" to detect collision may be on the order of $O(2^{n/2})$ for n output bits; thus, it may take on the order of 2256 operations to locate a collision in a 512 bit output. "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof of knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of cryptocurrency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies on prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on a provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, proof may include a time-varying proof, which may have a time limit after which time-varying proof is no longer valid. Time limit may be calculated from an initial time, which may be a datum linked to a particular timestamp or other value representing a fixed moment in time, associated with time-varying proof; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 1, trace recompilation may include performing a trusted time evaluation of trace recompilation by processor 104. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a proof is an authentic proof that has the property of attested time. Generating a secure timestamp may be used to weed out spoofers or "man in the middle attacks."

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using proof. Additional data may include one or more additional data, including proof, that are generated by processor 104. Additional data may be hashed into a Merkle tree or other hash tree, such that a root of the hash tree may be incorporated in an entry in a hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. proof, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, processor 104 or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Still referring to FIG. 1, memory 108 contains instructions configuring processor 104 to identify a trace 112. For the purposes of this disclosure, a "trace" is a record of instruction execution by a central processing unit. For the purposes of this disclosure, a "central processing unit," also called as "CPU" is the component of a computer system responsible for executing instructions. As a non-limiting example, CPU may include arithmetic logic unit (ALU), control unit, registers, and the like. For the purposes of this disclosure, an "arithmetic logic unit," also called "ALU" is a component of a computer's central processing unit that performs arithmetic and logical operations on data. As a non-limiting example, ALU may perform arithmetic operations such as addition, subtraction, multiplication, and division. As another non-limiting example, ALU may perform logical operations such as AND, OR, and XOR on binary data. As another non-limiting example, ALU may perform shift operations, comparison operations, or the like. As another non-limiting example, ALU may work in conjunction with a control unit of the CPU.

Still referring to FIG. 1, for the purposes of this disclosure, a "control unit" is a component of a computer's central processing unit that coordinates and controls the operations of the central processing unit and its associated components. As a non-limiting example, control unit may fetch instructions from the memory based on the program counter (PC) or instruction pointer (IP). It may determine the address of the next instruction to be executed. In a non-limiting example, once an instruction is fetched, control unit may decode it to understand its meaning and determine the required operations and operands. Then, control unit may control the execution of instructions by coordinating the flow of data and control signals within the CPU. In a non-limiting example, control unit may send instructions to ALU, specifying operations to be performed and operands involved. Then, ALU, in a non-limiting example, may perform the operation and return the result to control unit.

Still referring to FIG. 1, for the purposes of this disclosure, a "register" is an array of one or more memory units such as flip-flops, each unit storing a bit of data; one or more registers may be incorporated in and/or coupled to a processor such as the CPU. One or more registers may store and/or manipulate data during execution of instructions. One or more registers may include, without limitation, registers and/or memory elements such as flip-flops, latches, or the like used in processor caches such as level 1, level 2, or other caches, reservation stations for multithreaded and/or parallel computing protocols such as Tomasulo's algorithm, shift registers, or the like. As a non-limiting example, the number and size of registers may vary depending on the CPU architecture. For example, and without limitation, register may include 8-bit, 16-bit, 32-bit, 64-bit, or the like. In some embodiments, CPU may include a register file. For the purposes of this disclosure, a "register file" is a collection of registers. As a non-limiting example, register may include program counter (PC), stack pointer (SP), or the like. For the purposes of this disclosure, "program counter," also called "PC" is a special-purpose register in a central processing unit that holds the address of the next instruction to be fetched and executed. As a non-limiting example, program counter may keep track of the memory address of the current instruction being executed or the next instruction to be fetched from memory. In a non-limiting example, it may point to the location in memory where the CPU should read the next instruction. As a non-limiting example, program counter may be incremented after each instruction execution, causing it to point to the next instruction in memory. This may allow the CPU to execute instructions in a sequential order, following the program's control flow. In a non-limiting example, when an instruction is fetched from memory, program counter may provide the memory address to retrieve the instruction. The fetched instruction may be then passed to the instruction decoder for interpretation and execution. As a non-limiting example, the size of program counter may depend on the architecture of CPU. For example, and without limitation, a 32-bit CPU may include a 32-bit program counter. For the purposes of this disclosure, a "stack pointer," also called "SP" is a special-purpose register in a computer's central processing unit that keeps track of the top of the stack in the computer's memory. For the purposes of this disclosure, a "stack" is a region of memory used for storing data in a last-in, first-out manner.

Still referring to FIG. 1, for the purposes of this disclosure, an "instruction" is a specific operation or task that a computer processor can execute. In some embodiments, instruction may include instruction set architecture (ISA). For the purposes of this disclosure, an "instruction set architecture," also called "ISA" is the set of instructions that a particular processor can execute. As a non-limiting example, instruction may include an operation code (opcode) and zero or more operands. The opcode may specify the type of operation to be performed, such as arithmetic, logical, or memory access. The operands may provide the necessary data or addresses on which the operation is to be performed.

Still referring to FIG. 1, in some embodiments, processor 104 may be configured to identify trace 112 by simulating or emulating the execution of a program on a software-based processor model. In a non-limiting example, simulators and/or emulators may provide detailed information about the executed instructions, including their sequence, timing, and associated performance metrics. For the purposes of this disclosure, a "simulator" is a software program or tool that mimics the behavior of a specific system or component. In a non-limiting example, simulator may simulate the execution of instructions and behavior of hardware or software components without actually running on the physical hardware. As a non-limiting example, simulator may include RISC-V ISA simulator, gem 5, SPIM, or the like. For the purposes of this disclosure, an "emulator" is a software or hardware system that replicates the functionality of one computer system on a different computer system or platform. In a non-limiting example, emulator may enable the execution of programs or software designed for a particular architecture or operating system on a different architecture or operating system. In a non-limiting example, emulator may provide a layer of abstraction that allows programs written for one system to run seamlessly on another system. As a non-limiting example, emulator may include RISC-V emulator, QEMU, Bochs, or the like. For the purposes of this disclosure, a "RISC-V emulator" is a software tool that emulates the behavior of a computer system based on the RISC-V architecture.

Still referring to FIG. 1, in some embodiments, identifying trace 112 includes identifying at least an operation of trace 112. In some embodiments, processor 104 may iterate through trace 112 and identify operation of trace 112. In some embodiments, processor 104 may divide trace 112 into trace segment 116 as a function of an identified operation as described below. For the purposes of this disclosure, an "operation" is a specific action or computation performed by a processor or computer system on data. As a non-limiting example, operation may include arithmetic operation, logical operation, data manipulation, control flow, or the like. In a non-limiting example, operation may involve manipulating data, performing calculations, making decisions, accessing and modifying memory, interacting with input and output devices, and executing control flow statements. Arithmetic operation and logical operation are further described above.

Still referring to FIG. 1, in some embodiments, processor 104 may be configured to generate a cryptographic hash for trace 112. Cryptographic hash disclosed herein is further described above. As a non-limiting example, cryptographic hash may include a fixed-length string of characters. In some embodiments, cryptographic hash may be produced by hashing algorithm. As a non-limiting example, hashing algorithm may include SHA-256, MD5, SHA-1, or the like. In some embodiments, processor 104 may concatenate trace 112 in an order. In a non-limiting example, processor 104 may pass trace 112 or concatenated trace through hashing algorithm and generate cryptographic hash for trace 112.

Still referring to FIG. 1, memory 108 contains instructions configuring processor 104 to divide trace 112 into a plurality of trace segments 116. For the purposes of this disclosure, a "trace segment" is a portion or subsection of the overall trace. In some embodiments, processor 104 is configured to divide trace 112 into a plurality of trace segments 116 as a function of operation of trace 112. In a non-limiting example, trace 112 may grow very large for practical problems, and the need to extend it may exacerbate the problem with an algorithm of quasilinear complexity. In some embodiments, the statement being proven may be split into many small statements, which can each be proven independently, and then may use recursion to compose them in a tree as described further below. As a result, as a non-limiting example, the size of the task may grow linearly with the size of the statement, rather than quasilinearly. In some embodiments, processor 104 may divide trace 112 into trace segment 116 based on specific event, control flow structures such as loops or conditionals, time intervals, or the like. In some embodiments, each trace segment 116 may be configured to receive a memory state and produce a cryptographic commitment of a memory. For the purposes of this disclosure, a "memory state" is a state of memory at a particular point in the execution of a program. In some embodiments, memory state may serve as a record or snapshot of the contents of memory, including variables, data structures, and other stored information. As a non-limiting example, trace segment 116 may include memory state that represents a state of memory of a preceding trace segment 116. For the purposes of this disclosure, a "cryptographic commitment" is a cryptographic data that serves as evidence of the validity and consistency of the new state of memory. As a non-limiting example, cryptographic commitment may include Merkle commitment, vector commitment, or the like. In a non-limiting example, cryptographic commitment may provide assurance that the memory has not been tampered with or modified during the execution of the program. Cryptographic commitment may include a Pedersen commitment. A "commitment," as used herein, is a cryptographic algorithm that allows the user to commit to a certain value without revealing it. A "Pedersen commitment," as used herein is a specific type of commitment that uses a secret message with at least two elements, a random secret, and a commitment algorithm that produces a commitment as a function of the secret message and a random secret. A receiver/verifier is given the commitment, secret message, and random secret and can verify the commitment by putting the secret message and random secret back into the commitment algorithm. A cryptographic commitment may additionally or alternatively include a cryptographic hash of a datum to which to be committed. A cryptographic commitment may, for instance and without limitation include inclusion of value to be committed to in a cryptographic accumulator such as a Merkle tree. In some embodiments, each trace segment 116 may be further configured to produce cryptographic commitment of a memory difference. In some embodiments, memory state may include memory difference. For the purposes of this disclosure, a "memory difference" is the changes or modifications that occur in the state of memory between two consecutive trace segments. In a non-limiting example, when trace segment 116 receives a memory state representing the previous memory state, processor 104 may compare it with the current memory state. By identifying the differences or modifications between these two states, in a non-limiting example, processor 104 may calculate memory difference. As a non-limiting example, memory difference may include the specific updates, additions, deletions, or modifications that have occurred in the memory. In some embodiments, cryptographic commitment may include memory difference and memory of preceding memory combined. In a non-limiting example, when processor 104 produce cryptographic commitment of a memory difference, processor 104 may create a new trace segment that includes memory difference and memory of preceding memory.

Still referring to FIG. 1, in some embodiments, in commit-once Merkle tree approach, it may create a special data structure called a Merkle tree that contains all the memory values used during the execution of the program. Once the program finishes running, this Merkle tree is committed, meaning that it is fixed and won't change anymore. Each individual proof in the recursive tree can then access and use this committed Merkle tree to verify the memory values.

Still referring to FIG. 1, memory 108 contains instructions configuring processor 104 to recompile trace segment 116 for zero-knowledge proof generation. For the purposes of this disclosure, "trace recompilation" is the process of improving the efficiency and performance of a trace for zero-knowledge proof generation. In a non-limiting example, recompilation may aim to reduce the computational overhead, memory usage, or other resource requirements associated with executing and processing trace 112. For example, and without limitation, recompilation may achieve faster processing speeds, reducing execution time, and improving overall system performance. For example, and without limitation, recompilation may achieve minimizing memory consumption by reducing the amount of memory needed for data storage or optimizing data structures and algorithms to use memory more efficiently. For example, and without limitation, recompilation may achieve reducing the storage size required for data or optimize file and data compression techniques to minimize disk space usage. For example, and without limitation, recompilation may achieve minimizing power consumption and improving energy efficiency. For example, and without limitation, recompilation may achieve ensuring that a system or application can scale effectively to handle increasing workloads or larger datasets without significant degradation in performance or resource consumption. For example, and without limitation, recompilation may achieve reducing overall costs associated with a system or application, such as minimizing infrastructure requirements, lowering hardware or operational expenses, or optimizing resource utilization to achieve the desired outcomes within budget constraints.

Still referring to FIG. 1, in some embodiments, recompiling trace segment 116 may include recognizing a loop within trace segments 116, wherein the loop may include a loop input, transforming the loop into a proof, wherein the proof may include a proof of the loop and the loop input and inserting the proof into trace segments 116. For the purposes of this disclosure, a "loop" is a control structure that allows for the repetition of a certain block of code until a specified condition is met. For the purposes of this disclosure, a "loop input" is data that is provided as input to a loop before it begins its execution. In some embodiments, processor 104 may identify a loop by analyzing a sequence and pattern of instructions executed within trace segment 116. As a non-limiting example, processor 104 may identify loop using various algorithms and techniques such as but not limited to a control flow analysis, which may analyze the flow of execution within trace segment 116 and identify repeated patterns or branches that indicate the presence of a loop. In some embodiments, processor 104 may identify a loop, jump, branching command that decrements a program counter without a function call using a compiler. As a non-limiting example, the compiler may perform lexical analysis, breaking the source code into individual tokens such as keywords, identifiers, operators, and literals, and syntax analysis, parsing to create an abstract syntax tree (AST) from the sequence of tokens. Continuing the non-limiting example, the compiler may analyze the AST to identify different control flow constructs, including loops, conditionals, and function calls. Once the compiler identifies control flow constructs, the compiler may identify patterns that indicate loops, jumps, branching commands, functional calls, or the like. In some cases, the compiler may construct a control flow graph (CFG) based on the AST. The "CFG" is a directed graph where nodes represent basic blocks, which are sequences of instructions with a single entry point and a single exit point. The edges between nodes may represent possible control flow transfers between the basic blocks. In the CFG, branching commands can be identified as nodes with multiple outgoing edges. These nodes may represent points in the code where the program can take different paths based on conditional expressions or jump instructions. In a non-limiting example, the compiler may identify "for" loops, "while" loops or "do-while" loops. In another non-limiting example, the compiler may identify if-statements, switch-statements, and jump instructions such as but not limited to "goto," "continue" or "break." The compiler disclosed herein is further described below. As another non-limiting example, processor 104 may identify a loop using loop unrolling, loop detection heuristics, or loop profiling, which may analyze the behavior and characteristics of the executed instructions to identify loops and their associated loop inputs. Trace optimization may differ from traditional binary translation where a destination of every conditional branch is already known, as is the condition value, since the program has already run. This may provide unique opportunities for optimizations, particularly regarding iteration as described above.

Still referring to FIG. 1, in a non-limiting example, processor 104 may identify an iteration that has been implemented recursively. As a non-limiting example, processor 104 may identify self-referential function calls. For the purposes of this disclosure, "self-referential function call," also known as "recursion" is a technique in programming where a function calls itself in order to solve a problem. As a non-limiting example, self-referential function calls may solve complex problems by breaking them down into smaller instances of the same problem. In some embodiments, recursion may also be used for traversing tree structures, searching algorithms (like binary search), and various mathematical calculations. As a non-limiting example, analyzing code to detect instances where recursion has been utilized to emulate iterative behavior may offer valuable insights at both high and low levels of code representation. This analysis may discern patterns of self-referential function calls within the codebase, indicating the presence of recursive behavior, which may aid in comprehending the program's fundamental structure, logic, and design choices. In a non-limiting example, in the context of high-level source code, recognizing recursion may aid in understanding the programming paradigm employed and may reveal the manner in which iteration has been simulated using recursive constructs. By unveiling instances where recursion serves as a surrogate for iteration, reviewers and analysts may evaluate whether alternative approaches, such as iterative solutions, might offer enhanced efficiency or readability. This assessment aligns with best practices in code review and optimization, contributing to the development of more maintainable and performant software. In a non-limiting example, in the realm of low-level assembly instructions, the identification of recursion can be nuanced due to compiler optimizations. In some embodiments, compilers transform recursive constructs into intricate sequences of assembly instructions, obfuscating the clear delineation between recursion and other control flow patterns while in scenarios where the original code retains a recognizable recursive structure within the assembly representation, discerning self-referential function calls may remain pertinent.

Still referring to FIG. 1, in some cases, processor 104 may identify loop by parsing trace segment 116. As a non-limiting example, processor 104 may parse trace segment 116 using a number of querying tools, including without limitation keywords using a language processing module as described below (such as but not limited to loop input), field-restricted search, Boolean queries, phrase search, concept search, concordance search, proximity search, regular expression, fuzzy search, wildcard search, and the like. In some cases, keywords may be used to perform a query. In some embodiments, recompiling trace segment 116 may include recognizing a loop within trace segments 116, where the loop may be configured to assess and update data structure during iterations of the loop, and inserting a new loop into trace segments 116, wherein the new loop may block the data structure at a final update of the data structure at a loop termination. For the purposes of this disclosure, a "final update" refers to the last modification or change made to a data structure. As a non-limiting example, data structure may include persistent data structure (PDS), immutable data structure, versioned data structure, Trie-based data structure, log-structured data structure, or the like. For the purposes of this disclosure, "persistent data structure," also called "PDS" is a type of data structure that preserves the previous versions of the structure after performing modifications or updates.

Still referring to FIG. 1, in some embodiments, processor 104 may recompile trace segment 116 using a recompilation machine learning model. For the purposes of this disclosure, an "recompilation machine learning model" is a machine learning model that recompile a trace segment. In some embodiments, recompilation machine learning model may be consistent with a machine learning model described with respect to FIG. 2. In some embodiments, recompilation machine learning model may be trained with recompilation training data. For the purposes of this disclosure, "recompilation training data" is training data that is used to train a recompilation machine learning model. In some embodiments, recompilation machine learning model may be trained with recompilation training data that correlates a trace segment data set and/or a trace segment data set and a recompilation data set and recompilation machine learning model may output a recompiled trace segment 120 or recompiled trace. The recompilation training data disclosed herein may be consistent with training data described with respect to FIG. 2. In some embodiments, recompilation training data may be received from a user, database, external computing devices, and/or previous iterations of processing. As a non-limiting example, recompilation training data may include instructions from a user, who may be an expert user, a past user in embodiments disclosed herein, or the like, which may be stored in memory and/or stored in database, where the instructions may include labeling of training examples.

Still referring to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, memory 108 contains instructions configuring processor 104 to generate a zero-knowledge proof 124 for each recompiled trace segment 120. In some embodiments, zero-knowledge proof 124 may be utilized as a proof of work and a proof of time. Proof of work and zero-knowledge proof 124 disclosed herein are further described above. For the purposes of this disclosure, a "proof of time" is a decentralized consensus mechanism that works by selecting validators in proportion to their ranking scores and fixed stake. In a non-limiting example, decentralized consensus mechanism may be designed to validate transactions on the network. A "ranking score," as used herein, is a numerical weighting measure that the algorithm assigns to each validator based on its historical experience, the accuracy with which the node validates event data, and other validators' experience with the validator. A "fixed stake," as used herein is a staking mechanism where all the validators stake an equal amount of tokens to participate in the consensus process. Any node can participate as a validator provided it has staked a fixed amount of tokens and accumulated a ranking score. Proof of time may include a verifiable delay function (VDF) to pick nodes that propose blocks on the main chain (time electors) and nodes that confirm blocks to the main chain (time nodes) pseudo-randomly. In some embodiments, proof of time may include soft voting and hard voting. As a non-limiting example, nodes that submit event data to the main chain (publishers) may submit event data to the network, then randomly selected time elector may collate the submitted event data, verify its signature and compute VDF. Continuing the non-limiting example, time elector may relay the hashed event data and the VDF proof to the remainder of the time node. As time node receives the data, continuing the non-limiting example, it may trigger hard voting phase, where a committee of 1000 time notes, that are selected using VDF, may jointly determine if the submitted transaction is valid. If the majority of the time nodes vote to accept the proposed block, it may get appended to the main chain. s In a non-limiting example, proof of time may measure the number of chained proof segments of zero-knowledge proof 124 and a new proof segment may be referred to a previous proof segment's hash.

Still referring to FIG. 1, for the purposes of this disclosure, a "zero-knowledge proof" is a proof of statement that proves possession of the statement but does not reveal any additional information about the statement. In some embodiments, generating zero-knowledge proof 124 may include splitting zero-knowledge proof 124 into a plurality of proof segments using a proof recursion. In some embodiments, processor 104 may be configured to chain a plurality of proof segments, wherein the chained proof segments may include a tip proof segment. For the purposes of this disclosure, a "proof segment" is a portion or subsection of the overall zero-knowledge proof. In some embodiments, proof segment may include a proof of a single instruction's execution. For the purposes of this disclosure, a "proof recursion" is the process of constructing a proof by recursively breaking down a complex statement or problem into smaller, more manageable sub-proofs. In a non-limiting example, proof recursion may involve decomposing zero-knowledge proof 124 into proof segments and then recursively applying proof techniques to those components until reaching a base case or an elementary statement that can be proven directly. In a non-limiting example, recursion in proof construction may follow a hierarchical structure, where each level of recursion handles a smaller or simpler aspect of the original problem. The base case(s) may serve as the foundation, and as the recursion progresses, proof segments may be combined and interconnected to form a complete and coherent proof 124. In a non-limiting example, proof segment may include Merkle proof. For the purposes of this disclosure, "Merkle proofs" are cryptographic proofs that allow one to efficiently prove the membership or non-membership of a specific data element within a Merkle tree. A "Merkle tree," as disclosed herein, is a binary tree structure where the leaves represent the data elements, and each non-leaf node is a hash of its child nodes. In a non-limiting example, each leaf proof of a tree, such as but not limited to Merkle tree, may include a proof of a single instruction's execution. This may result, in a non-limiting example, in a plurality of leaf proofs; plurality may include very many, but very tiny, leaf proofs. This may include the advantage of making very simple leaf Arithmetic Intermediate Representation (AIR), but for large tasks the number of proofs may grow unwieldy. In a non-limiting example, RAM may be given as a Merkle root, and the leaf proof may only need to perform at most two lookups (instruction fetch and, depending on the instruction, memory access). In some embodiments, each leaf proof may include a number of steps of the underlying virtual machine (VM). This may allow to make the leaf proofs slightly larger and fewer for efficiency reasons and may allow to avoid using Merkle proofs for every step, especially if a memory location is repeatedly accessed and changed. In the latter case, a Merkle tree of the memory diff may be produced, which may reduce complexity. In a non-limiting example, depending on the design of the VM, steps may be proved out-of-order, so that similar memory accesses can be grouped together, further reducing the need for Merkle proofs. In a non-limiting example, leaf proofs may not be visible to the root proof. Therefore, continuing the non-limiting example, in order to count work, each recursive step may sum up the work of the interior proofs (which may themselves be recursive steps), rendering the final sum of work as a public input to the root proof.

Still referring to FIG. 1, for the purposes of this disclosure, a "tip proof segment" is a proof segment that is at the end of chained proof segments. In some embodiments, tip proof segment may include a number in chained proof segments. In a non-limiting example, proof segment may include a number of steps of instruction's execution. In some embodiments, each proof segment may refer to a previous proof segment's hash to extend clock cycle by one. For example, and without limitation, CPU may operate based on a clock cycle, where each cycle represents a unit of time during which a specific set of actions is performed. As a non-limiting example, if chained proof segments includes six chained proof segments, then tip proof segment may include 6. In some embodiments, processor 104 may be configured to compare chained proof segments with an unoptimized trace proof. For the purposes of this disclosure, an "unoptimized trace proof" is a proof that is generated for a trace that is not recompiled for a given recompilation criterion, which may include any form of recompilation described in this disclosure, such as without limitation recompilation for zero-knowledge proof generation. As a non-limiting example, unoptimized trace proof may be generated for a trace that is not recompiled for faster processing speeds, reducing execution time, improving overall system performance, minimizing memory consumption, reducing the storage size required for data, minimizing power consumption, improving energy efficiency, reducing overall costs or the like. In some embodiments, unoptimized trace proof may include a tip proof segment. In some embodiments, processor 104 may generate unoptimized trace proof for a trace that is not recompiled and compare chained proof segments with the unoptimized trace proof. As a non-limiting example, comparing chained proof segments with unoptimized trace proof may include comparing numbers of tip proof segments of chained proof segments and unoptimized trace proof. In some embodiments, processor 104 may accept zero-knowledge proof 124 if a number of tip proof segment of zero-knowledge proof 124 is smaller than a number of tip proof segment of unoptimized trace proof. In a non-limiting example, when chained proof segments may include a tip proof segment of 8 and unoptimized trace proof may include a tip proof segment of 10, processor 104 may accept zero-knowledge proof 124. In some embodiments, these may be consistent with measuring the size of witness. For the purposes of this disclosure, a "witness" is the information or data that is provided as evidence to support the validity or truthfulness of a statement or claim. As a non-limiting example, witness may include inputs, intermediate values, or other relevant data that demonstrate the execution or outcome of a computation or process. In some embodiments, witness may include trace 112, which in turn consists of a set of columns of finite field elements. As a non-limiting example, trace 112 may be organized into columns, with each data point being a value from a mathematical structure, a finite field. To bind a value, the value may be inserted into each column at a specified point, and then generate the proof. In a non-limiting example, altering the value in any column may require performing the low-degree extension (an FFT). In some embodiments, some intermediate values can be memorized, but the complexity of this step may still at least be linear in the size of the trace 112 (once for each column, and in general quasilinear but in a special case possibly linear for each column). In a non-limiting example, this value insertion may be achieved without disrupting the constraint system. In another non-limiting example, minimal modification to the constraint system may be achieved. As a non-limiting example, it may not require altering the transition constraints, but it may require altering the constraint denominators and it may require an assertion on the trace 112 (constraint). In some embodiments, constraint denominator may be already set for padding. In some embodiments, trace length may be extended to a power of two. In some embodiments, the transition constraints may be suspended for the extension, as it is just padding. In a non-limiting example, trace assertions may be added in the padding region for the bound value without concern for the main transition constraints. In some embodiments, recompiling trace 112 and generating zero-knowledge proof of the recompiled trace may pollute witness, which indicates that a significant amount of computational effort or work by prover may be required. As a non-limiting example, the non-amortizable work between committed values may be at least linear in the size of the witness. In some embodiments, the size of tip proof produced for some transaction DAG node X by the new system's prover may not be larger than the size of tip proof produced for X by some already accepted prover.

Still referring to FIG. 1, in some embodiments, processor 104 may be further configured to arithmetize a CPU architecture and target the arithmetized CPU architecture with a compiler. For the purposes of this disclosure, "arithmetize" refers to the process of transforming a problem or concept from its original form into a mathematical or algebraic representation. For the purposes of this disclosure, a "compiler" is a software tool or program that translates source code written in a high-level programming language into a lower-level representation, typically machine code or bytecode, that can be executed directly by a computer. As a non-limiting example, arithmetization may include plain arithmetization, multiple state machine arithmetization, microcoded arithmetization, or the like. In plain arithmetization, in a non-limiting example, a proof system can be created to verify the execution of an ISA state machine using mathematical constraints. The plain arithmetization may solve some challenging points regarding implementing field arithmetic as the field elements do not fit in an ISA register. For example, and without limitation, the first challenge can be dealing with misaligned memory accesses, where data is accessed from memory in a way that doesn't align with the processor's natural data size. This may be addressed, in a non-limiting example, by using built-in code to handle misaligned accesses. In another non-limiting example, the first challenge may be addressed by handling misalignment transparently, which can be more complex but results in quicker execution than the previous method. For another example, and without limitation, the second challenge may include decoding the instructions of the ISA state machine. This may be addressed by performing a full bit-decomposition of the instruction word in arithmetic intermediate representation (AIR). This, as a non-limiting example, may extract and sign-extend immediate, determine source and destination operands, and set flags to identify which subsystem of the constraints should provide an output. For another example, and without limitation, the third challenge may include interfacing with field arithmetic, which involves handling specialized mathematical operations. In a non-limiting example, this may be addressed by allowing the processor's registers to include field elements and include instructions to split them into high and low bits. In another non-limiting example, this may be addressed by creating new registers with new instructions for field operations, similar to floating-point extensions. In another non-limiting example, this may be addressed by ignoring field arithmetic.

Still referring to FIG. 1, in multiple state machine arithmetization, the architecture may be split into multiple state machines, each may be responsible for a specific job, such as but not limited to decoding and controlling instructions, doing arithmetic calculations, handling logic operations, managing memory, computing hash functions, or the like, that communicate through permutation arguments. By using multiple state machine arithmetization, some challenges regarding implementing field arithmetic as the field elements do not fit in an ISA register can be solved. As a non-limiting example, the first challenge can be dealing with misaligned memory accesses and by using multiple state machine arithmetization, this may be addressed by using built-in code to handle misaligned accesses. In another non-limiting example, it may be addressed by taking additional memory steps. As another non-limiting example, the second challenge may include decoding the instructions of the ISA state machine and by using multiple state machine arithmetization, this may be addressed by performing a full bit-decomposition of the instruction word in arithmetic intermediate representation (AIR) and compressing the decoding process. In another non-limiting example, it may be addressed by adding a cache to a decoder. As another non-limiting example, the third challenge may include interfacing with field arithmetic, which may be addressed by separating the field arithmetic into its own state machine with its registers. In another non-limiting example, it may be addressed by performing base arithmetic in the decoder.

Still referring to FIG. 1, in microcoded approach, the ISA can be built on top of the native ISA that is simple and friendly to zero-knowledge to decode instructions into microcode instructions to perform tasks. As a non-limiting example, by using native ISA with state machines may replace the decoder with an ISA, outsourcing the ISA tasks to independent state machines. In some embodiments, the decoder may be implemented in software. By using native ISA with state machines, some challenges regarding implementing field arithmetic as the field elements do not fit in an ISA register can be solved. As a non-limiting example, the first challenge can be dealing with misaligned memory accesses and by using native ISA with state machines, this may be addressed by using built-in code to handle misaligned accesses. In another non-limiting example, it may be addressed by taking additional memory steps. In another non-limiting example, it may be addressed by receiving a misalignment trap from the memory unit, or by detecting misalignment itself. As another non-limiting example, the second challenge may include decoding the instructions of the ISA state machine and by using native ISA with state machines, this may be addressed by using the decoder implemented in software as it can take a variable length to decode different formats. As another non-limiting example, the third challenge may include interfacing with field arithmetic, which may be addressed by creating new instructions specifically for the basic arithmetic operations. In a non-limiting example, it may be addressed by handling the basic arithmetic operations using the inner virtual machine, which may allow a recompiled routine, for instance, but without limitation, for Merkle checks or constraint evaluation in a recursive proof, to be directly written in microcode and called as a system call. In some embodiments, microcoded approach may include minimal native ISA with state machines. As a non-limiting example, the minimal native ISA with state machines may not include rewritable memory. As another non-limiting example, the minimal native ISA with state machines may need for persistent data structures and continuation passing style (CPS). In some embodiments, microcoded approach may include only the native minimal ISA. As a non-limiting example, the native minimal ISA may include a hash and range check unit. In a non-limiting example, the native minimal ISA may result in the smallest proof size. In some embodiments, arithmetization may include non-minimal ISA. In some embodiments, arithmetization may include non-uniform proof ISA that implements any ISA, such as, but not limited to, RISC-V, using the recursion. Rather than the leaves proving multiple steps of ISA, the non-uniform proof ISA may only prove one; furthermore, each leaf AIR may prove only a single instruction type.

Still referring to FIG. 1, in a non-limiting example, processor 104 may implement polynomial constraints to recognize each instruction and its consequences. In another non-limiting example, processor 104 may implement a single state machine that verifies the execution of the state machine in constraints. In another non-limiting example, processor 104 may split CPU architecture into multiple state machines that communicate through permutation arguments. In another non-limiting example, processor 104 may take a native ISA that includes zero-knowledge and build an ISA on top of the native ISA by analogy to physical CPUs that decode their instructions into microcode. In another non-limiting example, processor 104 may replace controller or decoder with an ISA that is a minimalistic ISA such that decoder is implemented in a program. In another non-limiting example, processor 104 may use an inner virtual machine that is made minimal such that it may not have rewritable memory. In another non-limiting example, processor 104 may include a native minimal ISA that includes a hash and range check unit. In another non-limiting example, processor 104 may commit a recorded memory of executions as a single Merkle tree that is public input to each proof, where leaves of the Merkle tree includes address, timestep and value of the address, so that processor 104 can check that memory accesses match what is in the proof. In another non-limiting example, processor 104 may include a stack machine of zero-knowledge virtual machine that includes multiple registers and instructions. In another non-limiting example, processor 104 may implement ISA that uses recursion, where leaves in a tree may prove one step of ISA.

Figure 2:
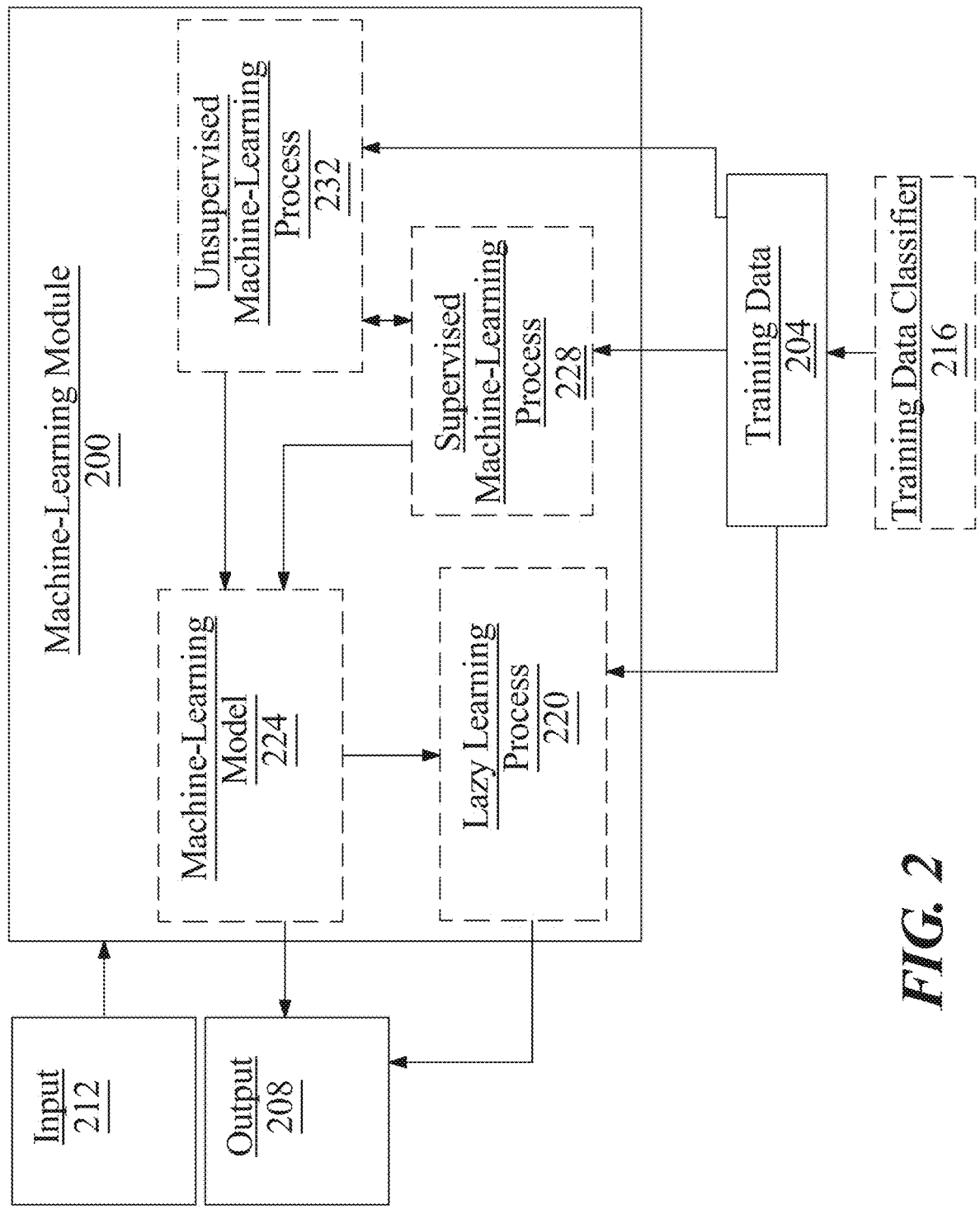
FIG. 2 illustrates a block diagram of an exemplary embodiment of a machine learning module.

Referring now to FIG. 2, an exemplary embodiment of a machine-learning module 200 that may perform one or more machine-learning processes as described in this disclosure is illustrated. A machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, input data may include trace 112, trace segment 116, or the like. As a non-limiting example, output data may include recompiled trace, recompiled trace segment 120, or the like.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to associative sets.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more images that fall below a specified threshold for image quality, particularly those with a level of blurriness that exceeds the defined standard. Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators that take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training data. For instance, and without limitation, preconditioning of training data may include upsampling, downsampling, or the like. In some embodiments, processor may use interpolation and/or upsampling methods to process datum. For instance, processor may convert a low pixel count image into a desired number of pixels. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a low pixel count image to a desired number of pixels. In some instances, a set of interpolation rules may be trained by sets of highly detailed images and images that may have been downsampled to smaller numbers of pixels, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine-learning model and output a pseudo replica sample-picture with dummy values assigned to pixels between the original pixels based on a set of interpolation rules. In some instances, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules.

Still referring to FIG. 2, processor may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. In some embodiments, processor may use luma or chroma averaging to fill in pixels in between original image pixels. Processor may down-sample datum to a desired lower number of pixels. As a non-limiting example, a high pixel count image may have 256 pixels, however a desired number of pixels may be 128. Processor may down-sample the high pixel count image to convert the 256 pixels into 128 pixels.

Still referring to FIG. 2, in some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and still referring to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include trace 112, trace segment 116, or the like as described above as inputs, recompiled trace, recompiled trace segment 120, or the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithms may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
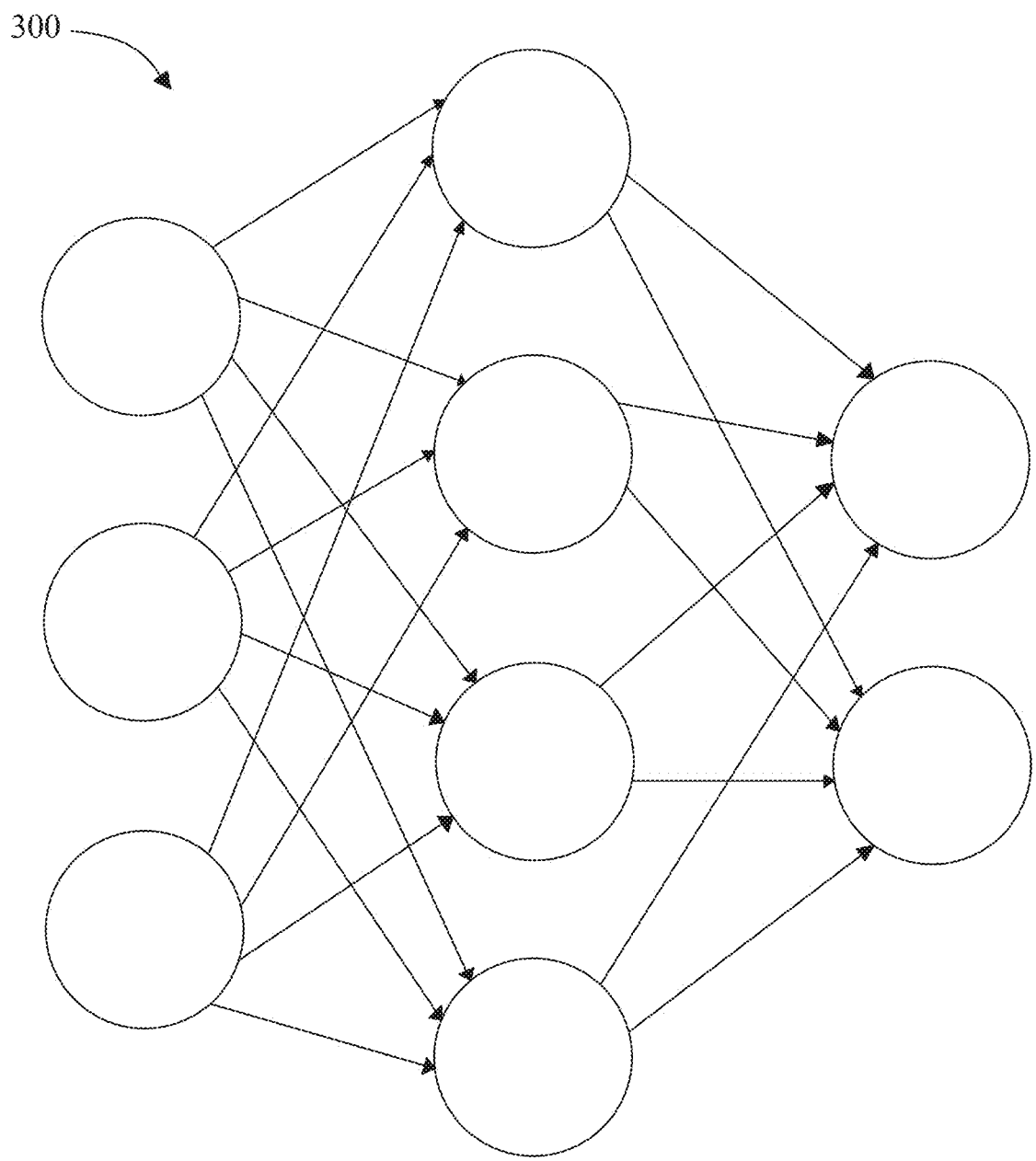
FIG. 3 illustrates a diagram of an exemplary nodal network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
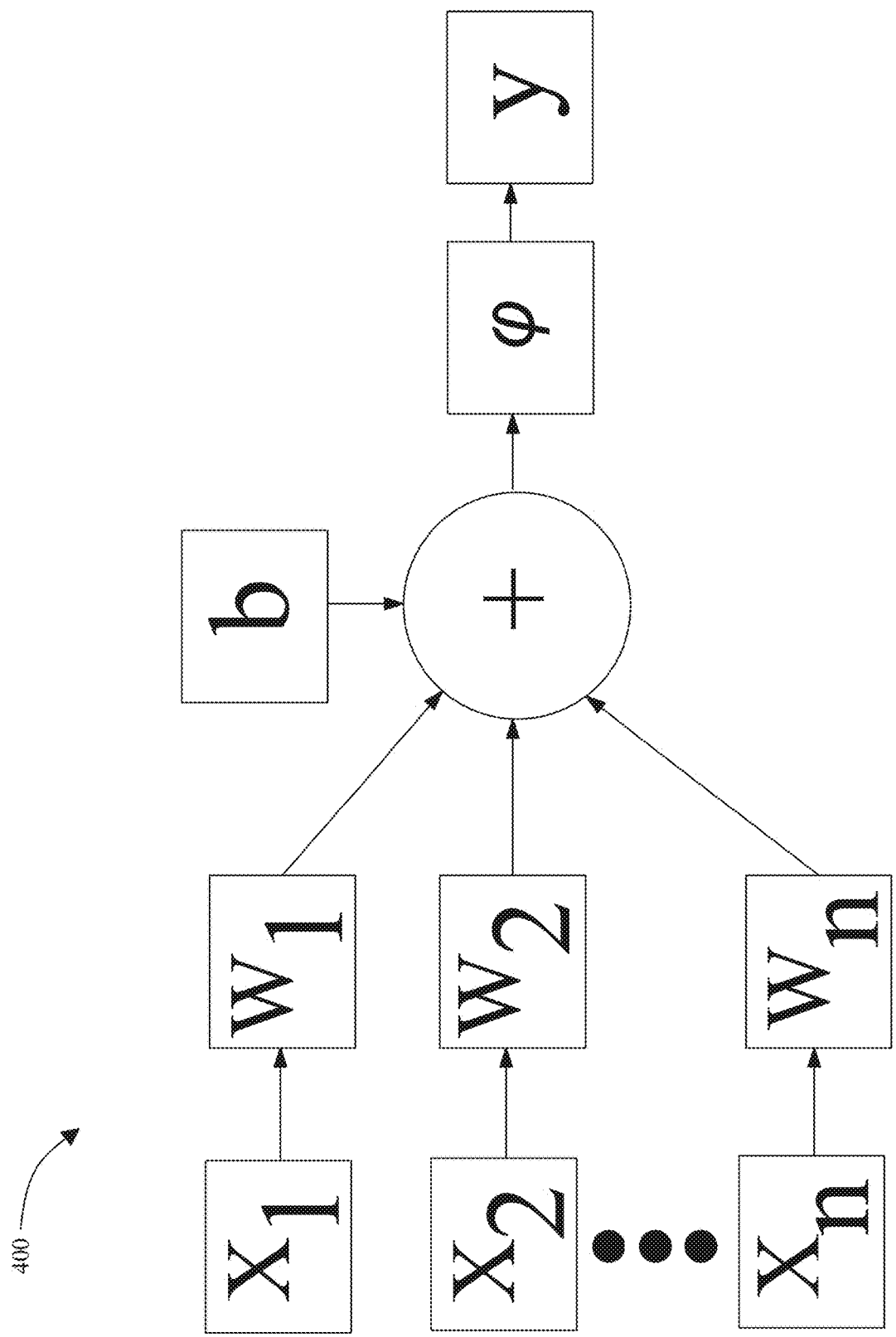
FIG. 4 illustrates a block diagram of an exemplary node.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
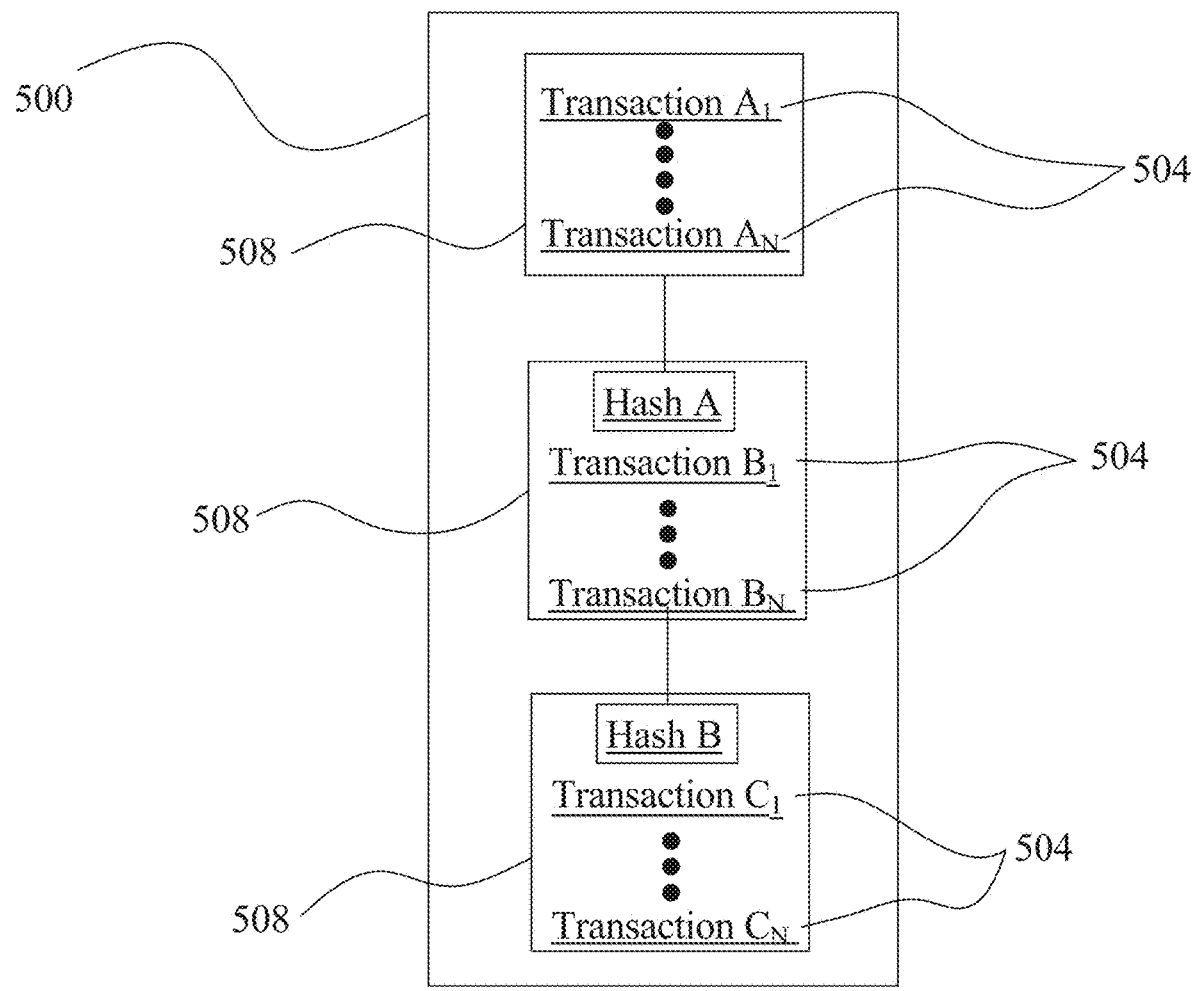
FIG. 5 illustrates a block diagram of an exemplary immutable sequential listing.

Referring now to FIG. 5, an exemplary embodiment of an immutable sequential listing 500 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing 500 may be, include and/or implement an immutable ledger, where data entries that have been posted to the immutable sequential listing cannot be altered. Data elements are listed in immutable sequential listing 500; data elements may include any form of data, including textual data, image data, encrypted data, cryptographically hashed data, and the like. Data elements may include, without limitation, one or more at least a digitally signed assertions. In one embodiment, a digitally signed assertion 504 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 504. In an embodiment, collection of textual data states that the owner of a certain transferable item represented in a digitally signed assertion 504 register is transferring that item to the owner of an address. A digitally signed assertion 504 may be signed by a digital signature created using the private key associated with the owner's public key, as described above.

Still referring to FIG. 5, a digitally signed assertion 504 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 504 may describe the transfer of a physical good; for instance, a digitally signed assertion 504 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 504 by means of an exterior protocol, such as the COLORED COINS created according to protocols developed by The Colored Coins Foundation, the MASTERCOIN® protocol developed by the Mastercoin Foundation, or the ETHEREUM® platform offered by the Stiftung Ethereum Foundation of Baar, Switzerland, the Thunder protocol developed by Thunder Consensus, or any other protocol.

Still referring to FIG. 5, in one embodiment, an address is a textual datum identifying the recipient of virtual currency or another item of value in a digitally signed assertion 504. In some embodiments, address is linked to a public key, the corresponding private key of which is owned by the recipient of a digitally signed assertion 504. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 504 may record a subsequent a digitally signed assertion 504 transferring some or all of the value transferred in the first a digitally signed assertion 504 to a new address in the same manner. A digitally signed assertion 504 may contain textual information that is not a transfer of some item of value in addition to, or as an alternative to, such a transfer. For instance, as described in further detail below, a digitally signed assertion 504 may indicate a confidence level associated with a distributed storage node as described in further detail below.

In an embodiment, and still referring to FIG. 5, immutable sequential listing 500 may record a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 500 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 5, immutable sequential listing 500 may preserve the order in which the at least a posted content took place by listing them in chronological order; alternatively or additionally, immutable sequential listing 500 may organize digitally signed assertions 504 into sub-listings 508 such as "blocks" in a blockchain, which may be themselves collected in a temporally sequential order; digitally signed assertions 504 within a sub-listing 508 may or may not be temporally sequential. The ledger may preserve the order in which at least a posted content took place by listing them in sub-listings 508 and placing the sub-listings 508 in chronological order. The immutable sequential listing 500 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 500 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and still referring to FIG. 5, immutable sequential listing 500, once formed, may be inalterable by any party, no matter what access rights that party possesses. For instance, immutable sequential listing 500 may include a hash chain, in which data is added during a successive hashing process to ensure non-repudiation. Immutable sequential listing 500 may include a blockchain. In one embodiment, a blockchain is immutable sequential listing 500 that records one or more new at least a posted content in a data item known as a sub-listing 508 or "block." An example of a blockchain is the BITCOIN® blockchain used to record BITCOIN® transactions and values. Sub-listings 508 may be created in a way that places the sub-listings 508 in chronological order and link each sub-listing 508 to a previous sub-listing 508 in the chronological order so that any computing device may traverse the sub-listings 508 in reverse chronological order to verify any at least a posted content listed in the blockchain. Each new sub-listing 508 may be required to contain a cryptographic hash describing the previous sub-listing 508. In some embodiments, the blockchain contains a single first sub-listing 508 sometimes known as a "genesis block."

Still referring to FIG. 5, the creation of a new sub-listing 508 may be computationally expensive; for instance, the creation of a new sub-listing 508 may be designed by a "proof of work" protocol accepted by all participants in forming the immutable sequential listing 500 to take a powerful set of computing devices a certain period of time to produce. Where one sub-listing 508 takes less time for a given set of computing devices to produce the sub-listing 508 protocol may adjust the algorithm to produce the next sub-listing 508 so that it will require more steps; where one sub-listing 508 takes more time for a given set of computing devices to produce the sub-listing 508 protocol may adjust the algorithm to produce the next sub-listing 508 so that it will require fewer steps. As an example, protocol may require a new sub-listing 508 to contain a cryptographic hash describing its contents; the cryptographic hash may be required to satisfy a mathematical condition, achieved by having the sub-listing 508 contain a number, called a nonce, whose value is determined after the fact by the discovery of the hash that satisfies the mathematical condition. Continuing the example, the protocol may be able to adjust the mathematical condition so that the discovery of the hash describing a sub-listing 508 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 508 according to the protocol is known as "mining." The creation of a new sub-listing 508 may be designed by a "proof of stake" protocol as will be apparent to those skilled in the art upon reviewing the entirety of this disclosure.

Continuing to refer to FIG. 5, in some embodiments, protocol also creates an incentive to mine new sub-listings 508. The incentive may be financial; for instance, successfully mining a new sub-listing 508 may result in the person or entity that mines the sub-listing 508 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 508 Each sub-listing 508 created in immutable sequential listing 500 may contain a record or at least a posted content describing one or more addresses that receive an incentive, such as virtual currency, as the result of successfully mining the sub-listing 508.

Still referring to FIG. 5, where two entities simultaneously create new sub-listings 508, immutable sequential listing 500 may develop a fork; protocol may determine which of the two alternate branches in the fork is the valid new portion of the immutable sequential listing 500 by evaluating, after a certain amount of time has passed, which branch is longer. "Length" may be measured according to the number of sub-listings 508 in the branch. Length may be measured according to the total computational cost of producing the branch. Protocol may treat only at least a posted content contained with the valid branch as a valid posted content. When a branch is found invalid according to this protocol, at least a posted content registered in that branch may be recreated in a new sub-listing 508 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 500 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 5, additional data linked to at least a posted content may be incorporated in sub-listings 508 in the immutable sequential listing; for instance, data may be incorporated in one or more fields recognized by blockchain protocols that permit a person or computer forming a at least a posted content to insert additional data in the immutable sequential listing. In some embodiments, additional data is incorporated in an unspendable at least a posted content field. For instance, the data may be incorporated in an OP_RETURN within the BITCOIN® blockchain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical cryptocurrency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Still referring to FIG. 5, in some embodiments, virtual currency is traded as a cryptocurrency. In one embodiment, a cryptocurrency is a digital currency such as BITCOIN®, PEERCOINS, NAMECOINS®, and LITECOINS®. Cryptocurrency may be a clone of another cryptocurrency. The cryptocurrency may be an "alt-coin." Cryptocurrency may be decentralized, with no particular entity controlling it; the integrity of the cryptocurrency may be maintained by adherence by its participants to established protocols for exchange and for production of new currency, which may be enforced by software implementing the cryptocurrency. Cryptocurrency may be centralized, with its protocols enforced or hosted by a particular entity. For instance, cryptocurrency may be maintained in a centralized ledger, as in the case of the XRP currency of Ripple Labs, Inc., of San Francisco, Calif. In lieu of a centrally controlling authority, such as a national bank, to manage currency values, the number of units of a particular cryptocurrency may be limited; the rate at which units of cryptocurrency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 508 in a blockchain computationally challenging; the incentive for producing sub-listings 508 may include the grant of new cryptocurrency to the miners. Quantities of cryptocurrency may be exchanged using at least a posted content as described above.

Figure 6:
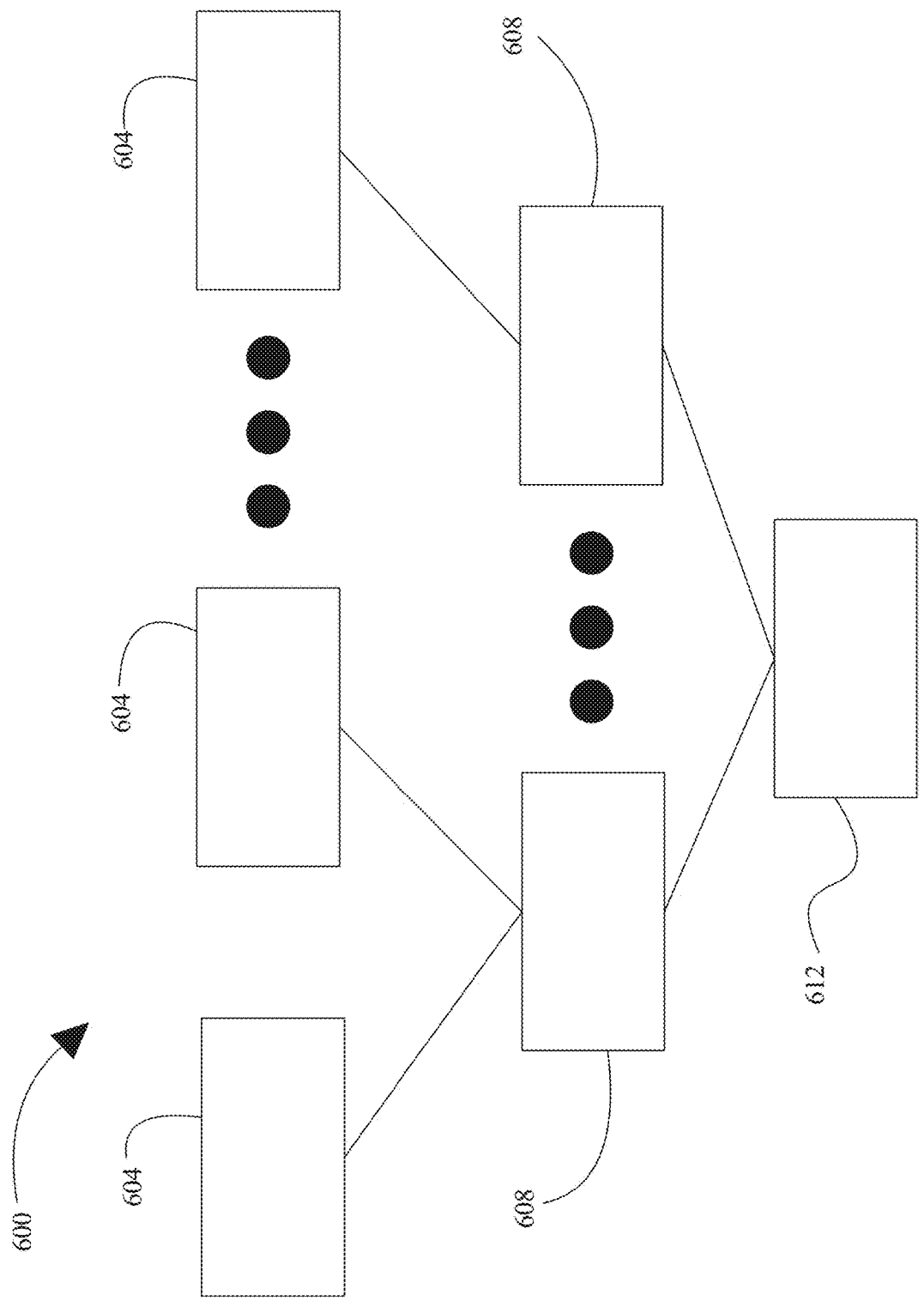
FIG. 6 illustrates a block diagram of an exemplary cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be a smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are created using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6, cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in a set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear pairing-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 7:
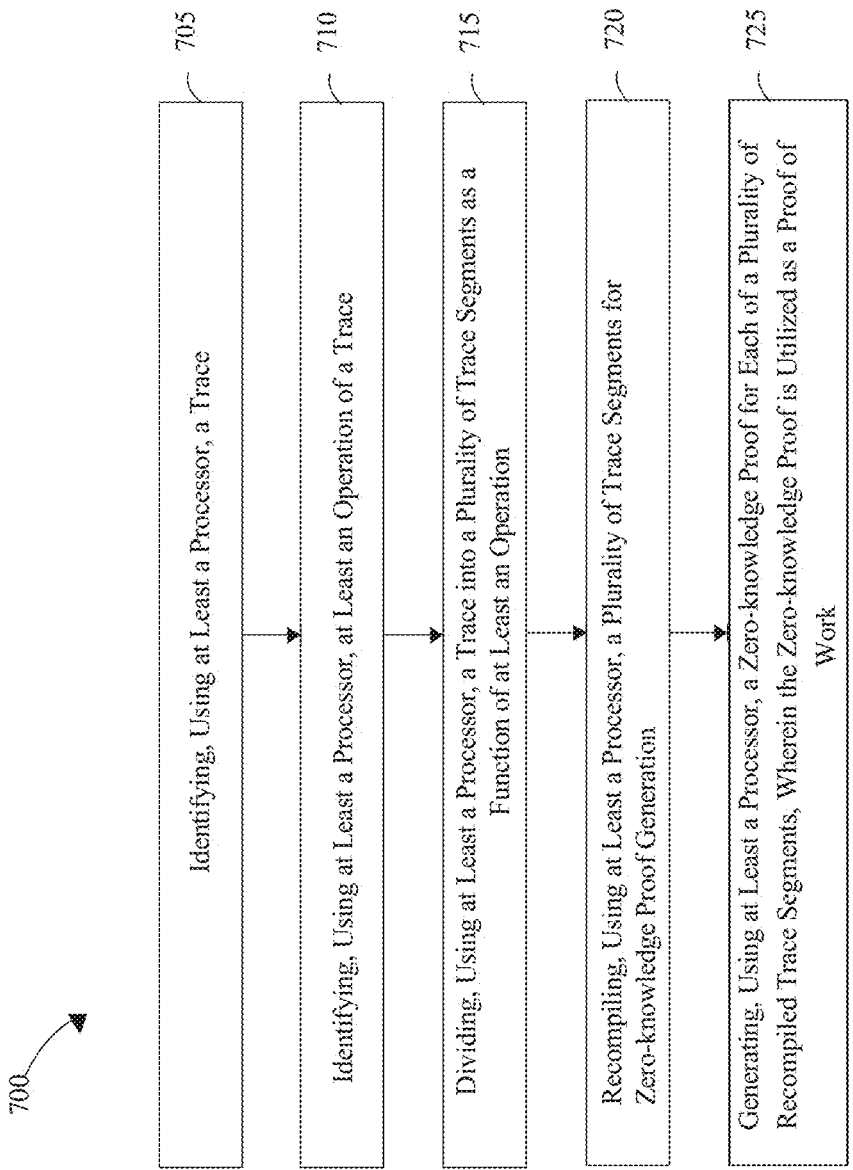
FIG. 7 illustrates a flow diagram of an exemplary method for facilitating zero-knowledge proofs.

Referring now to FIG. 7, a flow diagram of an exemplary method 700 for facilitating zero-knowledge proofs is illustrated. Method 700 includes a step 705 of identifying, using at least a processor, a trace. In some embodiments, method 700 may further include generating, using the at least a processor, a cryptographic hash for the trace. These may be implemented as disclosed with respect to FIGS. 1-6.

Still referring now to FIG. 7, method 700 includes a step 710 of identifying, using at least a processor, at least an operation of a trace. These may be implemented as disclosed with respect to FIGS. 1-6.

Still referring now to FIG. 7, method 700 includes a step 715 of dividing, using at least a processor, a trace into a plurality of trace segments as a function of at least an operation of the trace. In some embodiments, method 700 may further include receiving, using the at least a processor, a memory state that represents a state of memory of a preceding trace segment and producing, using the at least a processor, a cryptographic commitment of the memory state. In some embodiments, method 700 may further include producing, using the at least a processor, a cryptographic commitment of a memory difference of the memory state. In some embodiments, method 700 may further include generating, using the at least a processor, a zero-knowledge proof of the cryptographic commitment. These may be implemented as disclosed with respect to FIGS. 1-6.

Still referring now to FIG. 7, method 700 includes a step 720 of recompiling, using at least a processor, a plurality of trace segments for zero-knowledge proof generation. In some embodiments, method 700 may further include recognizing, using the at least a processor, a loop within the plurality of trace segments, wherein the loop comprises a loop input that generates the loop, transforming, using the at least a processor, the loop into a proof, wherein the proof may include a proof of the loop and the loop input and inserting, using the at least a processor, the proof into the plurality of trace segments. In some embodiments, method 700 may further include recognizing, using the at least a processor, a loop within the plurality of trace segments, wherein the loop is configured to assess and update a data structure during iterations of the loop and inserting, using the at least a processor, a new loop into the plurality of trace segments, wherein the new loop block the data structure at a look termination. These may be implemented as disclosed with respect to FIGS. 1-6.

Still referring now to FIG. 7, method 700 includes a step 725 of generating, using at least a processor, a zero-knowledge proof for each of a plurality of recompiled trace segments. In some embodiments, method 700 may further include splitting, using the at least a processor, the zero-knowledge proof into a plurality of proof segments using a proof recursion. In some embodiments, method 700 may further include chaining, using the at least a processor, the plurality of proof segments, wherein the chained proof segments may include a tip proof segment. In some embodiments, method 700 may further include comparing, using the at least a processor, the chained proof segments with an unoptimized trace proof. These may be implemented as disclosed with respect to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
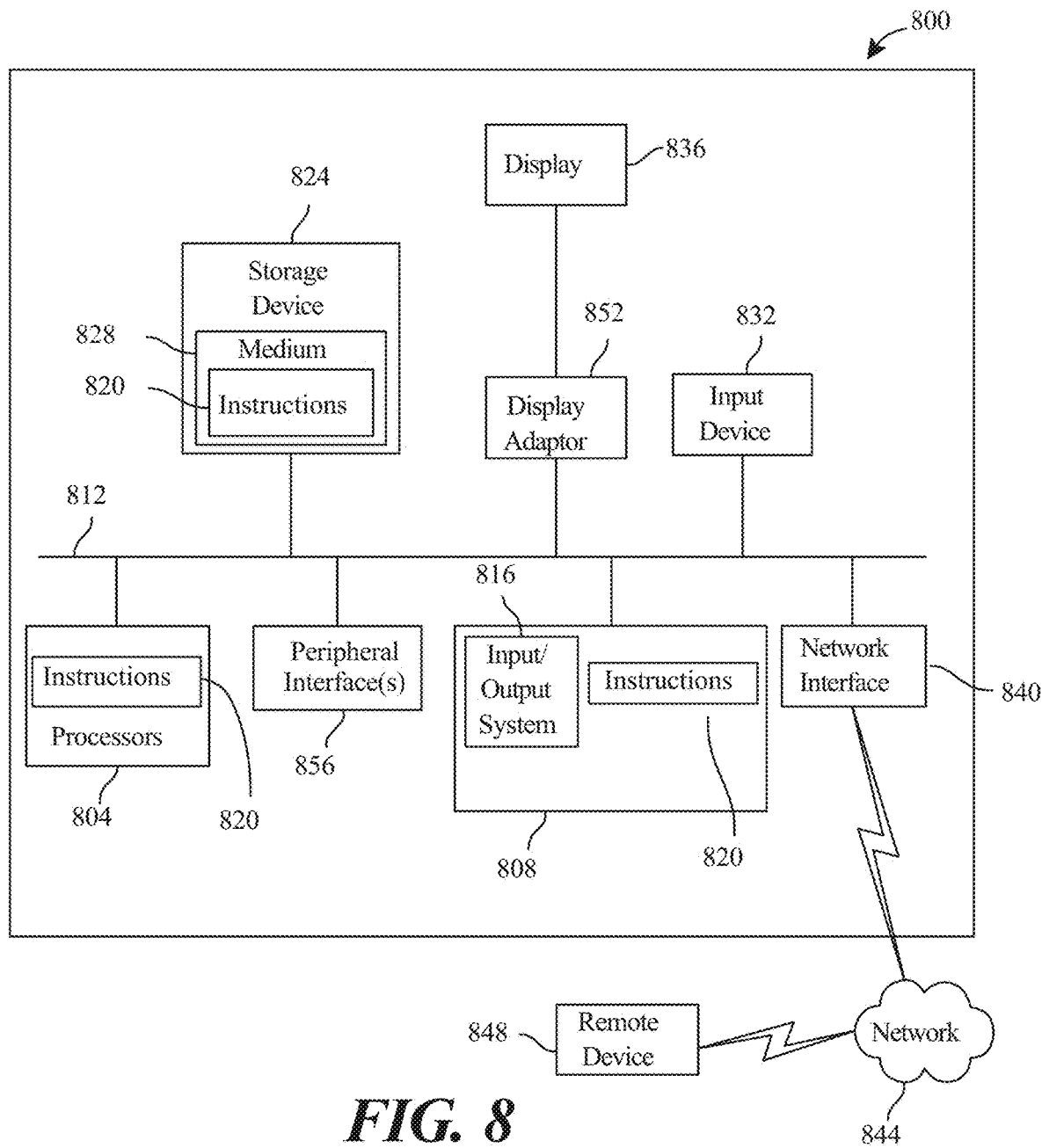
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for facilitating zero-knowledge proofs, wherein the apparatus comprises:
   at least a processor; and
   a memory communicatively connected to the at least a processor, the memory contains instructions configuring the at least a processor to:
   identify a trace;
   divide the trace into a plurality of trace segments, wherein dividing the trace comprises:
   identifying at least an operation of the trace; and
   dividing the trace into the plurality of trace segments as a function of the at least an operation of the trace;
   recompile the plurality of trace segments for zero-knowledge proof generation, wherein recompiling the plurality of trace segments comprises:
   recognizing a loop within the plurality of trace segments, wherein the loop comprises a loop input;
   transforming the loop into a proof, wherein the proof comprises a proof of the loop and the loop input; and
   inserting the proof into the plurality of trace segments; and
   generate a zero-knowledge proof for each of the plurality of recompiled trace segments.

2. The apparatus of claim 1, wherein identifying the trace comprises generating a cryptographic hash for the trace.

3. The apparatus of claim 1, wherein each of the plurality of trace segments is configured to:
   receive a memory state that represents a state of memory of a preceding trace segment; and
   produce a cryptographic commitment of the memory state.

4. The apparatus of claim 3, wherein:
   the memory state further comprises a memory difference; and
   each of the plurality of trace segments is further configured to produce a cryptographic commitment of the memory difference.

5. The apparatus of claim 3, wherein generating the zero-knowledge proof further comprises generating a zero-knowledge proof of the cryptographic commitment.

6. The apparatus of claim 1, wherein recompiling the plurality of trace segments comprises:
   recognizing a loop within the plurality of trace segments, wherein the loop is configured to assess and update a data structure during iterations of the loop; and
   inserting a new loop into the plurality of trace segments, wherein the new loop is configured to block update the data structure at a loop termination.

7. The apparatus of claim 1, wherein generating the zero-knowledge proof further comprises splitting the zero-knowledge proof into a plurality of proof segments using a proof recursion.

8. The apparatus of claim 7, wherein the memory contains instructions configuring the at least a processor to chain the plurality of proof segments, wherein the chained proof segments comprise a tip proof segment.

9. The apparatus of claim 8, wherein the memory contains instructions configuring the at least a processor to compare the chained proof segments with an unrecompiled trace proof.

10. A method for facilitating zero-knowledge proofs, wherein the method comprises:
    identifying, using at least a processor, a trace;
    identifying, using the at least a processor, at least an operation of the trace;
    dividing, using the at least a processor, the trace into a plurality of trace segments as a function of the at least an operation of the trace;
    recompiling, using the at least a processor, the plurality of trace segments for zero-knowledge proof generation, wherein recompiling the plurality of trace segments comprises:
    recognizing a loop within the plurality of trace segments, wherein the loop comprises a loop input;
    transforming the loop into a proof, wherein the proof comprises a proof of the loop and the loop input; and
    inserting the proof into the plurality of trace segments; and
    generating, using the at least a processor, a zero-knowledge proof for each of the plurality of recompiled trace segments.

11. The method of claim 10, further comprising:
    generating, using the at least a processor, a cryptographic hash for the trace.

12. The method of claim 10, further comprising:
    receiving, using the at least a processor, a memory state that represents a state of memory of a preceding trace segment; and producing, using the at least a processor, a cryptographic commitment of the memory state.

13. The method of claim 12, further comprising:
producing, using the at least a processor, a cryptographic commitment of a memory difference of the memory state.

14. The method of claim 12, further comprising:
generating, using the at least a processor, a zero-knowledge proof of the cryptographic commitment.

15. The method of claim 11, further comprising:
recognizing a loop within the plurality of trace segments, wherein the loop is configured to assess and update a data structure during iterations of the loop; and
inserting a new loop into the plurality of trace segments, wherein the new loop is configured to block update the data structure at a loop termination.

16. The method of claim 10, further comprising:
splitting, using the at least a processor, the zero-knowledge proof into a plurality of proof segments using a proof recursion.

17. The method of claim 16, further comprising:
chaining, using the at least a processor, the plurality of proof segments, wherein the chained proof segments comprises a tip proof segment.

18. The method of claim 17, further comprising:
comparing, using the at least a processor, the chained proof segments with an unrecompiled trace proof.

* * * * *